June 19, 1956 J. W. HOHMANN 2,750,669
FROZEN FOOD CUTTER
Filed June 28, 1955
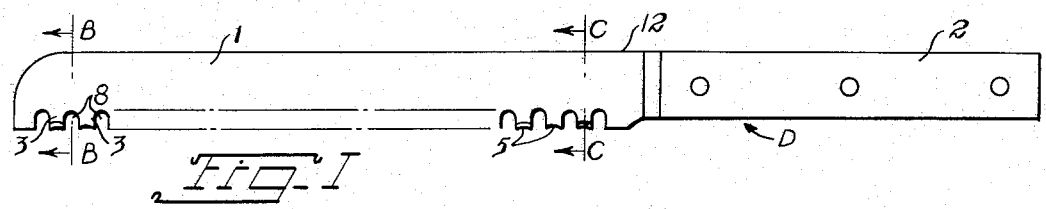
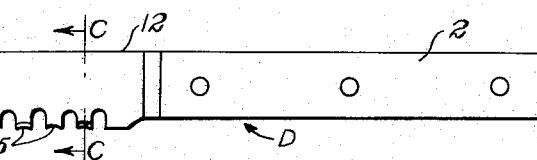
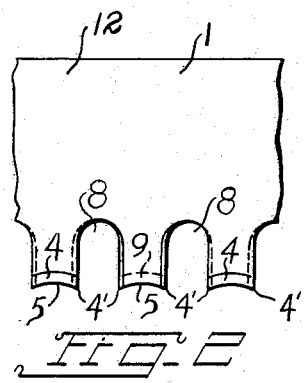
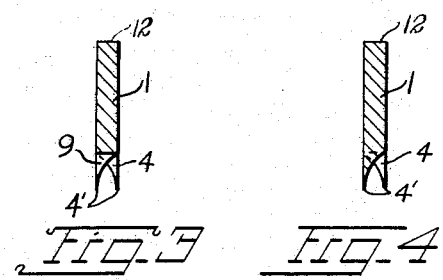
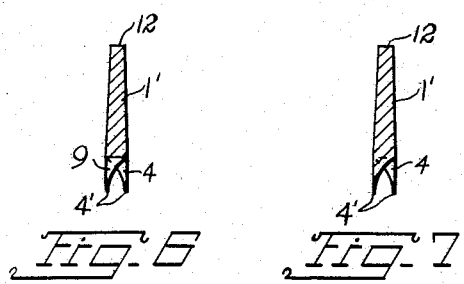
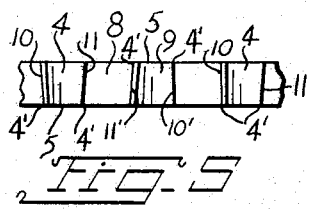
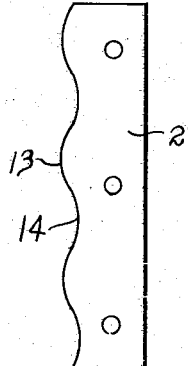
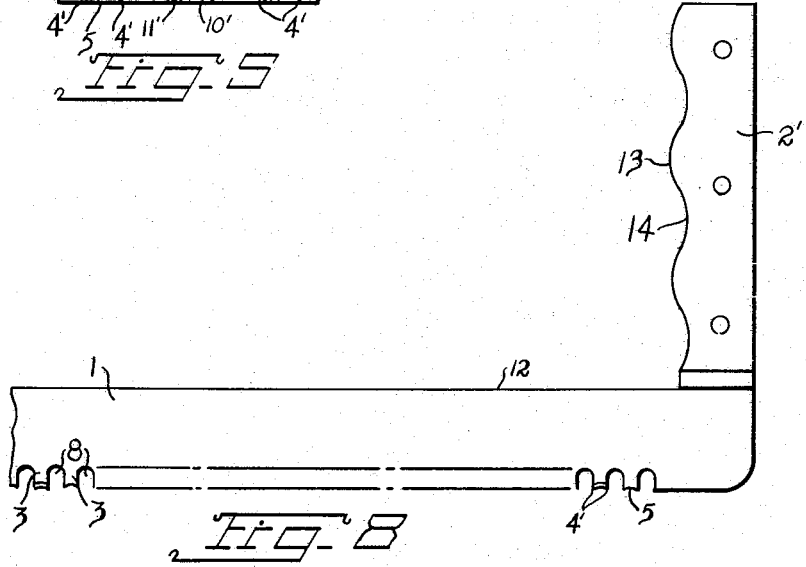

United States Patent Office 2,750,669
Patented June 19, 1956

2,750,669

FROZEN FOOD CUTTER

Joseph William Hohmann, North Bergen, N. J.

Application June 28, 1955, Serial No. 518,539

4 Claims. (Cl. 30—355)

This invention relates to cutters, specifically adapted for severing frozen vegetable and other food packages.

Many consumers do not find it economical or desirable to use an entire package of frozen food, particularly when a variety is desired or necessary. The general practice has been to thaw the package for division which is wasteful, as it cannot be frozen again and therefore must be used quickly to avoid spoilage.

The object of this invention is to provide a simple and efficient means for cleanly severing a package of frozen food into the desired portions without breaking the contents or removing the wrappings so that the remainder may be returned to the freezer in a frozen condition to be used when desired.

The improvement claimed is hereinafter fully set forth.

In the accompanying drawing,

Figure 1 is a side elevation of the cutter.

Fig. 2 is an enlarged fragmentary view of the teeth 3.

Fig. 3 is a vertical section on line B—B in Figure 1.

Fig. 4 is a vertical section on line C—C in Figure 1.

Fig. 5 is a bottom view of the slitting teeth shown in Fig. 2.

Figs. 6 and 7 are views similar to Figs. 3 and 4 of a preferred embodiment of cutter made from tapered stock, and Fig. 8 is a side elevation of a cutter with a modified form of handle.

Reference numerals indicate the same parts in the several drawings.

In the practice of the invention as herein exemplified it will be noted that there is no departure from the conventional shape usually to be found in a long broad blade bread knife. It has been impossible, however to sever into fractions a package of frozen vegetables or other foods with the generally used utensils such as serrated edge knives or ordinary knives. Saws in general are not satisfactory as they must be frequently removed to clear the teeth, and particles of paper and card board are intermingled with the food making it necessary to remove the foreign material before using the severed portion. This is due primarily to the fact that a frozen food is not a true solid. All food is mostly water and some crude fiber in cellular form. Frozen food, animal or vegetable, is substantially ice disposed in the cells to form a solid. The ice in block form is held in shape by the reinforcing action of the cellular and fibrous structure. It is this structure that clogs ordinary saw teeth and prevents further cutting until the saw blade is removed and the teeth cleaned. An ordinary knife or a serrated edge knife like a bread knife will not cut through frozen food or an ice cube or the like. It wedges.

In this disclosure the term cutter is used in a generic sense. In severing a frozen food package along the line of partition desired the blade of the cutter is usually reciprocated in edge contact with the package but no direct draw cut or sawing action as usually understood results. The action of the cutter is to first slot the package covering along one face, reduce the material engaged to a minute particle mass or pulp for a small fraction in depth at a time and then to entrap and disperse the minute loose particles of the mass or pulp to keep the line of severance clear and permit entire severance of the package by the continued reciprocation of the blade without removal.

In Figure 1 is shown a long broad blade 1, formed of some suitable material, usually steel, with a handle 2 at one end. Along the lower edge of the blade 1 are arranged a series of teeth 3 of generally polygonal formation with the opposed sides of the teeth being parallel. The free end of each tooth is curved from one side of the blade to form sharp points as shown at 4' for the purpose of slitting the engaged face or any engaged portion of the covering for the frozen food package.

The curved free ends of the teeth 3 are hollow ground or scalloped alternately from opposite sides of the blade 1 to form alternate scallops 4 on one face of one tooth 3 and 9 on the other face of the adjacent tooth. The spaced oppositely curved scallops 4 on one side of the blade and scallops 9 on the opposite side of the blade have a shaving action to triturate or comminute the frozen material of the package during the severing operation to form minute particles in the form of a pulp on the line of contact. Thus the teeth in the pulp forming action have no real cutting or sawing effect on the frozen food but rather the pulp is created by trituration and temporarily held in the curved hollow ground scallops. Between adjacent teeth of the row of teeth 3 are formed apertures or gullets 8 extending up into the body of the blade 1 as clearly shown in Figure 1. These gullets 8 receive the pulp particles shaped from the frozen food by contact with the scallops 4 and 9 on opposite sides of blade 1 as the same is reciprocated back and forth or moved on the line of severance of the frozen food package as released from the hollow ground faces of the teeth 3 where they are then dispersed back in the frozen food.

In operation the lower edge of the blade is engaged with a frozen food package along the line of severance. Reciprocation of the blade will slit the covering of any engaged face of the package and contact the food contents. The teeth 3 then function to reduce by trituration the material to a loose pulp for a small fraction in depth at a time. The minute shaved particles of the pulp formed from the frozen food in the line of contact are then raked into the gullets 8 and dispersed. Without removal of the blade the package may be entirely severed on the line of partition desired. The teeth 3 outside of a slight slitting action have no ripping or sawing action but function due to their configuration and the type of material worked upon only to triturate, reduce or pulverize the frozen material by the spaced scallops 4 and 9 on opposite sides of the blade. No excessive pressure is necessary to operate this cutter and it may be easily operated by a housewife to cleanly sever the frozen food package at a minimum effort. The lower curved edge 5 of teeth 3 is about .010" above the points 4' of the teeth 3.

The basic requirements for cutting a frozen food package without cleavage by force and relying entirely upon an edge contact of a movable tool such as a blade or the like is to slit the usual wrapping, form a loose mass or pulp by trituration along the line of severance at the point of blade contact, and then to entrap and disperse the mass or pulp along the line of severance in the tool as it progresses through the package. In the invention the slitting is accomplished by the points 4' of the teeth 3, the trituration or pulverizing to form the loose particle mass or pulp by the angle of the scallops 4 and 9 of each tooth 3 at opposite sides of the blade, and the entrapment and dispersion back into the frozen food of the mass or pulp by the gullets 8. The scallops 4 and 9 of the teeth 3 at opposite sides of the blade form in effect a series of correspondingly inclined chisels that shave off the ice and fibrous material of the frozen food package. By forming the teeth 3 by a series of curved hollow cuts across the edge of the body of the blade extending above the points 4' there is formed in effect on each tooth a chisel edge reversely arranged on each side of the blade.

Each scallop 4 has oppositely inclined chisel edges 10 and 11, and each scallop 9 has corresponding oppositely inclined chisel edges 10' and 11'. The chisel edges 10 and 11' facing in one direction function when the blade is reciprocated in that direction through the frozen food package against the same, and the chisel edges 10' and 11 function similarly upon opposite reciprocation. The edges 10 and 11' have no triturating function when the edges 10' and 11 function and vice versa.

In the embodiment shown in Figs. 6 and 7, the stock from which the blade 1 is machined has a tapered cross-section defining a back edge 12 for the blade of lesser transverse dimension than the teeth 3 of the cutting edge. Hence the cut in the frozen food is wider than the body of the blade 1, thereby reducing friction between the side faces of the blade and the side walls of the cut as the blade progresses into the frozen food.

In Fig. 8, there is shown a cutter of generally similar form to that shown in Figs. 1 to 5 or 6 and 7, except that the handle 2' is at right angles to the blade 1. This arrangement has certain advantages in that there is no need to provide a clearance for the fingers as shown at D in Fig. 1 and a greater pull and thrust can be exerted against the vertical handle. Finger-conforming bumps 12 and hollows 14 may also be provided.

Although the cutter disclosed herein is intended primarily as indicated above for severing frozen food packages, it can obviously be used also for other purposes such, for instance, as cutting bones. The housewife may find that the cutter is particularly useful for cutting through a ham bone, after the meat has first been cut, when separating the ham into individual steaks.

Furthermore, the invention is not limited to the particular forms of cutter disclosed herein but extends to all modifications and variations falling within the scope of the appended claims.

What is claimed as the invention and is desired to be secured by Letters Patent is:

1. A frozen food package cutter, comprising a blade having a cutting edge, a plurality of substantially polygonal teeth on the cutting edge of said blade, the free ends of said teeth being hollow ground on an arc alternately from opposite sides forming substantially parallel rows of downwardly facing cutting points at the bottom corners of each tooth defining sharp slitting edges to triturate the material of the package on the line of severance of the cutter during operation of the blade and means alternating with said teeth to clear the triturated material at the line of severance.

2. A cutter according to claim 1, wherein the blade is tapered away from its cutting edge.

3. A cutter according to claim 1, wherein the clearing means comprises gullets formed in the cutting edge of the blade alternately with said teeth.

4. A frozen food package cutter, comprising a blade tapered from its cutting edge to its back edge, a plurality of substantially polygonal teeth along the cutting edge of said blade, the bottom edges of the teeth being beveled alternately from opposite sides and hollow ground on an arc forming substantially parallel rows of sharp slitting edges with downwardly facing cutting points at the free corners of each tooth, said points being on a common plane to triturate the material of the package on the line of severance of the cutter during the operation of the blade, and gullets formed in the cutting edge of the blade alternately with said teeth to clear the triturated material at the line of severance.

References Cited in the file of this patent

UNITED STATES PATENTS

| | | |
|---|---|---|
| 696,050 | Iwan | Mar. 25, 1902 |
| 1,246,905 | Garlock et al. | Nov. 20, 1917 |
| 2,389,882 | Wood, Jr. | Nov. 27, 1945 |
| 2,671,267 | Michalek | Mar. 9, 1954 |
| 2,685,131 | Seeberger | Aug. 3, 1954 |
| 2,685,734 | Klein | Aug. 10, 1954 |